Patented July 18, 1933

1,918,251

UNITED STATES PATENT OFFICE

CAMILLE DREYFUS, OF NEW YORK, N. Y., AND HERBERT E. MARTIN AND LESLIE N. LEE, OF CUMBERLAND, MARYLAND, ASSIGNORS TO CELANESE CORPORATION OF AMERICA, A CORPORATION OF DELAWARE

METHOD OF PREPARING CELLULOSE ESTERS AND PRODUCT THEREOF

No Drawing.   Application filed December 11, 1928. Serial No. 325,382.

This invention relates to the preparation of cellulose esters and relates more particularly to the preliminary treatment of cellulosic material prior to esterification, whereby cellulose esters of improved color and clarity may be produced.

An object of our invention is to produce esters of cellulose, and particularly organic esters of cellulose, of high clarity and improved color.

A further object of our invention is to subject cellulosic material to a preliminary treatment including treating with nitric acid or similarly acting substances prior to the esterification of the same.

Esters of cellulose, and particularly organic esters of cellulose, when made by the methods now employed, while possessing many desirable properties form solutions that do not have as high clarity as is desired for many purposes. We have found that if cellulosic material is first treated with a mixture containing certain proportions of nitric acid and fatty acid or other appropriate diluent, based on the weight of the cellulose, at certain temperatures and for a given length of time, and then treated with a certain proportion of the anhydride of a lower fatty acid in the absence of substantial amounts of esterification promoting catalysts, the so treated cellulose may be esterified more rapidly to form cellulose esters of improved color and which form solutions of higher clarity.

In accordance with our invention, we treat cellulosic material with nitric acid or similarly acting substances and preferably, but not necessarily, in admixture with an aliphatic acid for a certain preferred period of time and at a certain preferred temperature. The cellulosic material is then treated with the anhydride of a lower fatty acid, such as acetic anhydride, propionic anhydride, etc., in the absence of an esterification promoting catalyst such as sulphuric acid. The cellulose thus treated when esterified, esterifies more rapidly than cellulose that has not been so treated and forms cellulose esters of improved color and higher clarity. We have found that the best results are obtained when the temperature, concentration and duration of treatment are carefully controlled.

The cellulose to be treated in accordance with our invention may be any suitable form of cellulose such as cotton, cotton linters, wood pulp that has been purified to the desired extent, reconstituted cellulose, etc.

The lower fatty acid with which the cellulose is treated in admixture with nitric acid may be any suitable one such as acetic acid, propionic acid or butyric acid. The ester of cellulose to be formed from the cellulose treated in accordance with our invention may be any suitable one such as cellulose acetate, cellulose propionate and cellulose butyrate. Even the preparation of cellulose nitrate from this pretreated cellulose is advantageous.

The amount of nitric acid employed in the preliminary treatment may vary from 0.5 to 4.0% and preferably from 1 to 2% of the weight of the cellulose being treated. As illustrative of the effect of the amount of nitric acid employed, it is pointed out that if nitric acid in amounts equal to 10% of the cellulose is employed, a cellulose acetate is formed having a clarity of but ½ of that of a cellulose acetate formed when only 1% of nitric acid is employed, when all other conditions are the same.

The amount of fatty acid, such as acetic acid, that is employed in admixture with the nitric acid for the treatment of the cellulose may vary from 75% to 330% or more of the weight of the cellulose treated. If less fatty acid is employed, cellulose esters of lower clarity are formed. The time of treatment of cellulose with the mixture of nitric acid and lower fatty acid is preferably about one hour.

As to the temperature at which the mixture of nitric acid and lower fatty acid is permitted to act on the cellulose, we prefer to employ a temperature between 35 and 60° C., and preferably between 40° and 50° C. If the temperature of treatment is lower than this, the clarity of the cellulose ester formed may be materially decreased, while at higher temperatures, degradation of the cellulose molecule is apt to occur.

After the cellulose has been treated with the mixture of nitric acid and lower fatty acid as above described, it is then subjected to the action of an anhydride of a lower fatty acid, such as acetic anhydride, in amounts varying from 10% to 300% of the weight of the cellulose at suitable temperatures such as room temperature, and for a suitable length of time such as an hour. At this stage substantially no esterification promoting catalyst such as sulphuric acid should be employed, since esterification is not desired.

The cellulose treated as above mentioned may then be esterified in any suitable manner, such as the addition of sufficient amounts of anhydride and a catalyst, such as sulphuric acid or zinc chloride. Because of this treatment, it may be esterified in two-fifths to three-fifths of the time required for esterifying cellulose that has not been so treated, and the amount of catalyst required may be materially reduced.

After esterification, a cellulose ester of improved color and improved clarity results. Thus cellulose acetate having clarities of 2 to 5 times the clarities of cellulose acetate made from cellulose that has not been pretreated in accordance with our invention may be formed. Moreover highly concentrated solutions of cellulose acetate made in accordance with our process have only a pale lemon color, whereas highly concentrated solutions of cellulose acetate made by former processes have a medium brown color.

A further higher clarity may be imparted to the solutions of the organic esters of cellulose made by our invention by centrifuging solutions of the same to remove some impurities. By this method cellulose acetate having a clarity of 6 to 13 times or more than that of the former cellulose acetates may be made.

The esters of cellulose produced by our invention, because of their higher clarity and freedom of color are eminently suited for making artificial silk, coating compositions, plastic compositions, films for photographic or other use, and sheets for making laminated glass where clarity is of especial importance. Another important use of our product is for making molding powders containing the finely ground cellulose ester and plastifiers.

In order further to illustrate our invention but without being limited thereto, the following specific examples are given.

Example I 30 parts by weight of cotton linters are treated with a mixture of 100 parts of glacial acetic acid and 0.5 parts of nitric acid of 70% concentration for one hour at 50° C. The mixture is then cooled to 24° C. and 10 parts of acetic anhydride are added and the mixture allowed to stand for one hour. The cotton linters so treated may then be acetylated.

For acetylation, 76 to 80 parts of acetic anhydride together with 4 to 4.5 parts of sulphuric acid as catalyst, which mixture has been cooled to 0° C., are added to the above mixture after the same has been cooled to 10° C. Acetylation proceeds rapidly and is completed in one-half the time required for acetylation of untreated cotton linters.

A cellulose acetate of light color having a clarity 2½ times that of cellulose acetate made by the prior processes is thus formed. If a solution of this cellulose acetate is formed and same is centrifuged, a cellulose acetate having a clarity of over 6 times that of ordinary cellulose acetate is produced.

If the temperature of treatment of the cotton linters with the mixture of nitric and acetic acid is raised from the 50° C. above described to 60° C., a cellulose acetate having a clarity of 3.5 times that of the prior cellulose acetate is formed, with corresponding higher clarity after centrifuging a solution of the same, but the product is somewhat degraded.

Example II

The process is carried out precisely in the same manner as that described in Example I, except that 1.0 parts of nitric acid of 70% concentration is used instead of 0.5 parts as set forth in said example.

A cellulose acetate having a clarity that is 4.2 times that of the clarity of cellulose acetate made by the prior processes is formed, and if a solution of the same is centrifuged, it has a clarity of 13 times that of such prior cellulose acetate.

If the pretreatment of the cellulose with the mixture of nitric acid and acetic acid is carried out at 20° C. instead of 50° C., cellulose acetate having a clarity of 3.5 times that of prior cellulose acetates is produced.

It is to be understood that the foregoing detailed description is given merely by way of illustration and that many variations may be made therein without departing from the spirit of our invention.

Having described our invention, what we claim and desire to secure by Letters Patent is:

1. The method of treating cellulose said method comprising treating cellulose with a mixture of nitric acid and a lower aliphatic acid in the absence of an esterification catalyst.

2. The method of treating cellulose said method comprising treating cellulose with a mixture of nitric acid and acetic acid in the absence of an esterification catalyst.

3. The method of pretreating cellulose comprising treating the cellulose with nitric acid and then treating the same with the anhydride of a lower aliphatic acid in the absence of substantial amounts of esterification promoting catalyst.

4. The method of pretreating cellulose comprising treating cellulose with nitric acid and then treating the same with acetic anhydride in the absence of substantial amounts of esterification promoting catalyst.

5. The method of pretreating cellulose comprising treating the cellulose with a mixture of nitric acid and a lower aliphatic acid and then treating the same with a lower aliphatic acid anhydride in the absence of substantial amounts of esterification promoting catalyst.

6. The method of pretreating cellulose comprising treating the cellulose with a mixture of nitric and acetic acid and then treating the same with acetic anhydride in the absence of substantial amounts of esterification promoting catalyst.

7. The method of pretreating cellulose comprising treating the cellulose with from 0.5 to 4.0% of its weight of nitric acid, from 75 to 330% of its weight of a lower aliphatic acid at a temperature from 35 to 60° C. and then treating the same with acetic anhydride.

8. The method of pretreating cellulose comprising treating the cellulose with from 0.5 to 4.0% of its weight of nitric acid, from 75 to 330% of its weight of acetic acid at a temperature from 35 to 60° C. and then treating the same with acetic anhydride.

9. The method of pretreating cellulose comprising treating the cellulose with from 0.5 to 4.0% of its weight of nitric acid, from 75 to 330% of its weight of acetic acid at a temperature from 40 to 50° C., and then treating the same with acetic anhydride.

10. The method of preparing organic esters of cellulose comprising pretreating cellulose with a mixture of nitric acid and a lower aliphatic acid and then treating the same with a lower aliphatic acid anhydride in the absence of substantial amounts of esterification promoting catalyst and then esterifying the same.

11. The method of preparing cellulose acetate comprising pretreating cellulose with a mixture of nitric and acetic acid and then treating the same with acetic anhydride in the absence of substantial amounts of esterification promoting catalyst, and then acetylizing the same.

12. Cellulose esters of high clarity, the acid radicals of which are derived solely from organic acids, prepared from cellulose that has been pretreated with nitric acid and then with a lower aliphatic acid anhydride in the absence of a catalyst.

13. Cellulose esters of high clarity, the acid radicals of which are derived solely from acetic acid, prepared from cellulose that has been pretreated with nitric acid and acetic acid and then with a lower aliphatic acid anhydride in the absence of a catalyst.

14. Cellulose esters of high clarity, the acid radicals of which are derived solely from acetic acid, prepared from cellulose that has been pretreated with a mixture of nitric acid and acetic acid and then with acetic acid anhydride in the absence of a catalyst.

CAMILLE DREYFUS.
HERBERT E. MARTIN.
LESLIE N. LEE.